United States Patent
Beynel et al.

(10) Patent No.: US 11,232,374 B2
(45) Date of Patent: Jan. 25, 2022

(54) TRAVEL DISRUPTION MANAGEMENT USING FRAGMENTED SOURCE DATA

(71) Applicant: Amadeus S.A.S., Biot (FR)

(72) Inventors: Mathieu Beynel, Pegomas (FR); Elsa Anselmet, Paris (FR); Olivier Cazeaux, Juan les Pins (FR)

(73) Assignee: AMADEUS S.A.S., Biot (FR)

( * ) Notice: Subject to any disclaimer, the term of this patent is extended or adjusted under 35 U.S.C. 154(b) by 595 days.

(21) Appl. No.: 15/918,386

(22) Filed: Mar. 12, 2018

(65) Prior Publication Data

US 2019/0279318 A1    Sep. 12, 2019

(51) Int. Cl.
*G06Q 10/02* (2012.01)
*G06Q 50/14* (2012.01)

(52) U.S. Cl.
CPC ........... *G06Q 10/02* (2013.01); *G06Q 10/025* (2013.01); *G06Q 50/14* (2013.01)

(58) Field of Classification Search
CPC ...................................................... G06Q 10/02
See application file for complete search history.

(56) References Cited

U.S. PATENT DOCUMENTS

| | | | | |
|---|---|---|---|---|
| 5,832,451 | A * | 11/1998 | Flake | G06Q 10/02 705/5 |
| 9,639,842 | B1 | 5/2017 | Green et al. | |
| 2003/0177044 | A1* | 9/2003 | Sokel | G06Q 10/02 705/5 |
| 2004/0039614 | A1 | 2/2004 | Maycotte et al. | |
| 2005/0216281 | A1* | 9/2005 | Prior | G06Q 10/02 705/5 |
| 2009/0276250 | A1* | 11/2009 | King | G06Q 10/107 705/5 |
| 2010/0228577 | A1* | 9/2010 | Cunningham | G06Q 10/02 705/5 |

(Continued)

FOREIGN PATENT DOCUMENTS

WO    2010063778 A1    6/2010

OTHER PUBLICATIONS

LeonSoftware.com (screen grab of Apr. 4, 2016 https://wiki.leonsoftware.com/leon/flight-watch last accessed Nov. 3, 2020) (Year: 2016).*

(Continued)

*Primary Examiner* — Emmett K. Walsh
(74) *Attorney, Agent, or Firm* — Thompson Hine LLP

(57) ABSTRACT

Systems and methods for detecting disruption events that impact itineraries using data obtained from fragmented sources. A disruption event that impacts a segment of an itinerary is detected using data obtained from a number of fragmented sources. A record identifier associated with a reservation record generated in a reservation database in response to reserving the itinerary is identified. A disruption element corresponding to the segment is generated in the reservation record to store data indicating a net difference between a base state of the segment at a time of a ticketing of the itinerary and an actual state of the segment at a time the segment terminates. A difference between the base state and a state of the segment following the disruption event is determined. The disruption element is populated with data indicating the difference.

19 Claims, 6 Drawing Sheets

(56) References Cited

U.S. PATENT DOCUMENTS

| | | | |
|---|---|---|---|
| 2010/0312586 A1 | 12/2010 | Drefs | |
| 2012/0072249 A1 | 3/2012 | Weir et al. | |
| 2014/0052481 A1 | 2/2014 | Monteil et al. | |
| 2014/0095066 A1 | 4/2014 | Bouillet et al. | |
| 2014/0278615 A1 | 9/2014 | Ince et al. | |
| 2015/0058050 A1 | 2/2015 | Tebourbi et al. | |
| 2015/0073842 A1* | 3/2015 | Aljabarti | G06Q 10/02 705/5 |
| 2015/0127408 A1 | 5/2015 | Miller | |
| 2015/0161528 A1 | 6/2015 | Yalcin et al. | |
| 2015/0178763 A1 | 6/2015 | Hasnas et al. | |
| 2016/0125326 A1* | 5/2016 | Miller | G06Q 10/02 705/5 |
| 2016/0125327 A1 | 5/2016 | Lamoureux et al. | |
| 2016/0189066 A1 | 6/2016 | Liao et al. | |
| 2017/0308972 A1* | 10/2017 | Atkins | G06Q 30/0201 |
| 2018/0053121 A1 | 2/2018 | Gonzalez et al. | |
| 2018/0285782 A1* | 10/2018 | Costas | G06Q 50/14 |

OTHER PUBLICATIONS

"Official Journal of the European Union", Regulation (EC) No. 261/2004 of the European Parliament and of the Council of Feb. 11, 2004 (Year: 2004).*

Wu et al., "Comparative Analysis on Propagation Effects of Flight Delays: A Case Study of China Airlines", Journal of Advanced Transportation vol. 2018 (Year: 2018).*

USPTO, Office Action issued in U.S. Appl. No. 15/918,448 dated Aug. 13, 2020.

L. Sherry, G. Calderon-Meza and A. Samant, "Trends in airline passenger trip delays (2007-2009)," 2010 Integrated Communications, Navigation, and Surveillance Conference Proceedings, Herndon, VA, 2010, pp. J5-1-J5-8.

National Institute of Industrial Property, Preliminary Search Report issued in French Application No. 1852097 dated Dec. 2, 2019.

Lufthansa Systems, "NetLine/Ops++", product brochure, retrieved from the internet on Aug. 7, 2017 at https://www.lhsystems.com/sites/default/files/product/2017/pb_netline_ops_0.pdf.

European Patent Office, International Search Report and Written Opinion issued in International Application No. PCT/EP2019/052858 dated Mar. 28, 2019.

USPTO, Office Action issued in U.S. Appl. No. 15/918,553 dated Dec. 23, 2020.

USPTO, final rejection dated Feb. 1, 2021 in U.S. Appl. No. 15/918,448.

Weiwei Wu, Cheng-Lung Wu, Tao Feng, Haoyu Zhang, Shuping Qiu, "Comparative Analysis on Propagation Effects of Flight Delays: A Case Study of China Airlines", Journal of Advanced Transportation, vol. 2018, Article ID 5236798, 10 pages, 2018.

USPTO, Notice of Allowance dated May 5, 2021 in U.S. Appl. No. 15/918,553.

Zacharia, "Data, Machine Learning, and User Experience, with Giorgos Zacharia, CTO, Kayak", CXOTalk, Mar. 13, 2015, retrieved from the internet at https://www.cxotalk.com/episode/data-machine-learning-user-experience-giorgos-zacharia-cto-kayak.

USPTO, Notice of Allowance dated Oct. 4, 2021 in U.S. Appl. No. 15/918,448.

* cited by examiner

TRAVEL DISRUPTION MANAGEMENT USING FRAGMENTED SOURCE DATA

TECHNICAL FIELD

The present invention relates generally to disruption management in the travel industry, although not limited thereto. More specifically, the present invention relates to techniques for detecting transportation service disruptions in the travel industry using data obtained from a plurality of fragmented sources.

BACKGROUND

Despite best efforts to avoid them, events that disrupt transportation services ("disruption events") are a persistent challenge faced by both travel providers and the passengers they serve. As used herein, a "disruption event" refers to a specific occurrence (or incident) that defines a deviation from normal operating conditions for a travel service provider. When a segment of an itinerary is impacted by a disruption event, a state of that segment is different than a base state of that segment at a time the itinerary was ticketed. Examples of disruption events include flight delays or cancellations, changes in seat assignments or cabin class, unscheduled stopovers, changes in stopover locations, unscheduled ground transfers, reduced connection times, and the like.

From a passenger's perspective, any deviations between the travel service they purchased and the travel service actually received will at minimum negatively impact the passenger's perception of the travel service provider that provided the travel service. Such deviations may also prevent (or at least delay) the passenger from reaching a scheduled meeting or vacation destination that prompted that travel. From a travel service provider's perspective, such deviations impacting a travel service between two cities can have a ripple effect throughout their travel service networks.

Conventional systems generally detect disruption events using reservation record data. However, disruption events can arise for any number of reasons that may not be reflected in reservation record data: including mechanical problems with equipment, crew availability, or weather conditions. Moreover, conventional systems that log disruption events will often create a separate entry in a reservation record for each disruption event detected. As some passengers may attest, a single segment of a travel itinerary can be impacted by a sequence of disruption events. For example, a scheduled departure time of travel conveyance servicing a segment may be delayed numerous times. Yet, in other instances, the scheduled departure time may initially be delayed by some time and then later advanced to the originally scheduled departure time. When that happens, conventional systems may detect and separately log two disruption events even though there was no aggregated disruption—the travel conveyance departed at the originally scheduled departure time.

SUMMARY

Embodiments of the present invention provide systems, methods, and computer-readable storage media for in-transit detection and mitigation of transportation service disruptions in the travel industry using data obtained from a plurality of fragmented sources. In an embodiment, a system includes a computing device and a computer-readable storage medium that includes a set of instructions. Upon execution by the computing device, the set of instructions cause the system to detect a disruption event that impacts a segment of an itinerary using data obtained from a plurality of fragmented sources. A record identifier associated with a reservation record generated in a reservation database in response to reserving the itinerary is determined. In response to detecting the disruption event, a disruption element corresponding to the segment is generated in the reservation record associated with the record identifier. The disruption element stores data indicative of a net difference between a base state of the segment at a time of a ticketing of the itinerary and an actual state of the segment at a time that the segment terminates. A difference is determined between the base state of the segment and a state of the segment following the disruption event using data indicative of the base state obtained from the reservation record. The disruption element is populated with data indicative of the determined difference between the base state of the segment and the state of the segment following the disruption event.

In another embodiment, a method includes detecting a disruption event that impacts a segment of an itinerary using data obtained from a plurality of fragmented sources. A record identifier associated with a reservation record generated in a reservation database in response to reserving the itinerary is determined. In response to detecting the disruption event, a disruption element corresponding to the segment is generated in the reservation record that is associated with the record identifier. The disruption element stores data indicative of a net difference between a base state of the segment at a time of a ticketing of the inventory and an actual state of the segment at a time that the segment terminates. A difference between the base state of the segment and a state of the segment following the disruption event is determined using data indicative of the base state obtained from the reservation record. The disruption element is populated with data indicative of the determined difference between the base state of the segment and the state of the segment following the disruption event.

In another embodiment, a non-transitory computer-readable storage medium including computer-readable instructions is provided. Upon execution by a processor of a computing device, the computer-readable instructions cause the computing device to detect a disruption event that impacts a segment of an itinerary using data obtained from a plurality of fragmented sources. A record identifier associated with a reservation record generated in a reservation database in response to reserving the itinerary is determined. In response to detecting the disruption event, a disruption element corresponding to the segment is generated in the reservation record associated with the record identifier. The disruption element stores data indicative of a net difference between a base state of the segment at a time of a ticketing of the itinerary and an actual state of the segment at a time that the segment terminates. A difference between the base state of the segment and a state of the segment following the disruption event is determined using data indicative of the base state obtained from the reservation record. The disruption element is populated with data indicative of the determined difference between the base state of the segment and the state of the segment following the disruption event.

In embodiments, a second disruption event is detected that impacts the segment of the itinerary subsequent to detecting the disruption event. In embodiments, the disruption element is updated with data indicative of a difference between the base state of the segment and a state of the segment following the second disruption event. In embodiments, the disruption event is a first delay in a scheduled arrival time of a travel conveyance servicing the segment, the second disruption event is a second delay in the scheduled arrival time, and the data indicative of the difference between the base state of the segment and the state of the segment following the second disruption event is a net difference in the scheduled arrival time that combines the first delay and the second delay.

In embodiments, a third disruption event is detected that impacts a second segment of the itinerary. In embodiments, a second disruption element corresponding to the second segment is generated in the reservation record in response to detecting the third disruption event. The second disruption element storing data indicative of a net difference between a base state of the second segment at a time of a ticketing of the itinerary and an actual state of the second segment at a time the second segment terminates.

In embodiments, a difference between the base state of the second segment and a state of the second segment following the third disruption event is determined using data indicative of the base state of the second segment obtained from the reservation record. In embodiments, the second disruption element is populated with data indicative of the difference between the base state of the second segment and the state of the second segment following the third disruption event.

In embodiments, an identifier corresponding to a user profile associated with the itinerary is identified using information obtained from the reservation record. In embodiments, a disruption metric is generated that quantifies a relative impact of disruption events that impact the segment using data obtained from the disruption element. In embodiments, the user profile corresponding to the identifier is populated with the disruption metric. In embodiments, a time dilution factor is applied to the disruption metric that adjusts the disruption metric based on how much advance notice of the first disruption event was provided. In embodiments, the plurality of fragmented sources include a customer management departure control system ("DC S-CM") associated with a travel provider servicing the segment, a flight management departure control system ("DCS-FM") associated with the travel provider, an inventory management system associated with the travel provider, or a combination thereof.

In embodiments, the disruption event is a modification of a seat map corresponding to a travel conveyance servicing the segment. In embodiments, the second disruption event is a delay in a scheduled arrival time of the travel conveyance, and the data indicative of the difference between the base state of the segment and the state of the segment following the second disruption event is a net difference in the scheduled arrival time following the delay and an indication of a seat change due to the modification of the seat map. In embodiments, generating the disruption element includes cascading the disruption element through a service of a remote server hosting the reservation database. In embodiments, the disruption element is iteratively updated in response to detecting additional disruption events that impact the segment using data obtained from the plurality of fragmented sources.

In embodiments, the additional disruption events include: an unscheduled stopover location being added, a scheduled stopover location being replaced with an unscheduled stopover location, a change in a cabin class associated with the segment, a ground transfer being added, a modification of the segment that results in a reduced connection time, a special service request associated with the segment being unfulfilled, a modification of a seat map corresponding to a travel conveyance servicing the segment, a modification of a seating protocol established by a travel provider operating the travel conveyance, an unscheduled gate change, a wait time for retrieval of checked baggage that exceeds a predefined threshold, or a combination thereof.

In embodiments, a root cause of the disruption event is identified using the data obtained from the plurality of fragmented sources. In embodiments, the disruption element is updated to include an indication of the root cause. In embodiments, the root cause relates to a crew delay, a weather condition, a passenger delay, a ground delay, a baggage delay, a baggage loss, a tail assignment, a seasonal schedule change, or a combination thereof. In embodiments, the disruption event corresponds to a travel conveyance servicing the first segment being cancelled, delayed, rescheduled, diverted en-route, reassigned, replaced, or a combination thereof. In embodiments, the disruption event is detected using data obtained from an Aircraft Movement Message ("MVT"), an Aircraft Initiated Movement Message ("MVA"), or a combination thereof.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The accompanying drawings, which are incorporated in and constitute a part of this specification, illustrate various embodiments of the present invention and, together with the general description of the invention given above, and the detailed description of the embodiments given below, serve to explain the embodiments of the invention. In the drawings, like reference numerals are used to indicate like parts in the various views.

DETAILED DESCRIPTION

Figure 1:
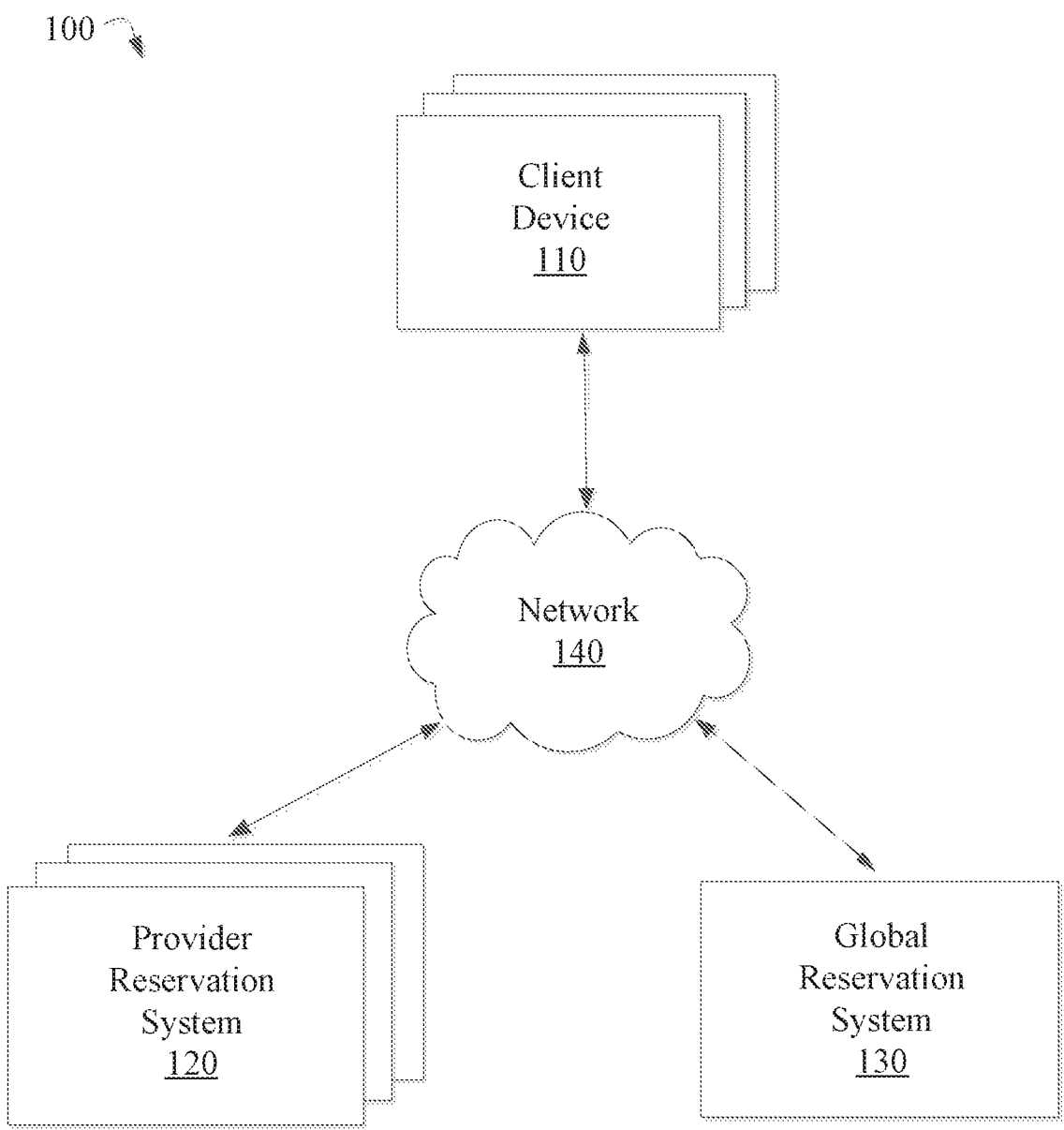
FIG. 1 is a block diagram of an example operating environment that is suitable for implementing aspects of the present invention.

Techniques described herein relate to detecting disruption events that impact itineraries using data obtained from a plurality of fragmented sources. Referring to FIG. 1, an example operating environment for implementing aspects of the present invention is illustrated and designated generally 100. In general, operating environment 100 represents the various systems involved in processing travel reservations for users (e.g., customers or passengers) in the travel industry. Operating environment 100 includes client device 110, provider reservation system ("PRS") 120, and global reservation system ("GRS") 130. As depicted in FIG. 1, the various systems communicate with each other via a network 140, which may include one or more public and/or private networks. Examples of networks that are suitable for implementing network 140 include: local area networks ("LANs"), wide area networks ("WANs"), cellular network, the Internet, and the like.

In operation, client device 110 interacts with PRS 120 and/or GRS 130 to obtain data related to travel services ("travel-related data") and services related to booking travel services ("travel-related services"). Examples of travel-related data include inventory data, fare data, routing data, scheduling data, check-in data, boarding data, and the like. Examples of travel-related services include reserving travel services that define an itinerary, ticketing the reserved travel services that define an itinerary, and the like. For the purposes of the present disclosure, an "itinerary" refers to a structured travel route between an origin location and a destination location. Examples of systems suitable for implementing client device 110 include: a smartphone, a laptop, a personal computer, a mobile computing device, a cryptic terminal, a remote server hosting a travel metasearch website, an online travel agency website, and the like.

PRS 120 is a computer reservation system configured to provide customers with both travel-related data and travel-related services associated with a particular travel service provider. Examples of systems suitable for implementing PRS 120 are provided by Delta Air Lines, Incorporated of Atlanta, Ga., and American Airlines Group, Incorporated of Fort Worth, Tex.

GRS 130 is another computer reservation system configured to provide customers with both travel-related data and travel-related services. An example of a system suitable for implementing GRS 130 is provided by Amadeus IT Group of Madrid, Spain. In contrast to PRS 120, the travel-related data and travel-related services that GRS 130 provides is associated with multiple travel service providers. In an embodiment, a reservation system described below with respect to FIG. 2 may be used to implement PRS 120, GRS, 130, or a combination thereof.

In an embodiment, GRS 130 directly accesses travel-related data associated with a particular travel service provider using a web service interface published by a remote server hosting that travel-related data. For example, an inventory management system of PRS 120 may publish a web service interface for accessing travel-related data associated with a particular travel service provider. In an embodiment, a remote server periodically pushes travel-related data associated with a particular travel service provider to GRS 130 where that travel-related data is locally replicated. For example, an inventory management system of PRS 120 may periodically push travel-related data associated with a particular travel service provider to GRS 130 for local replication. In an embodiment, GRS 130 stores and manages travel-related data for PRS 120.

Figure 6:
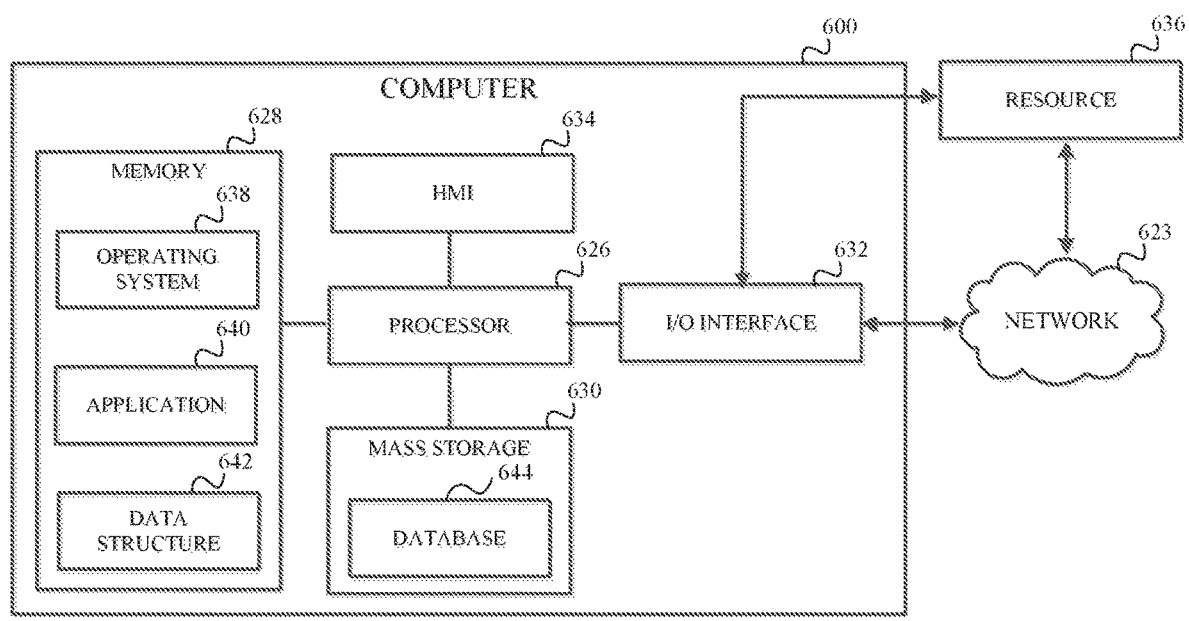
FIG. 6 is a block diagram of an example computing environment suitable for use in implementing embodiments of the invention.

Each of the systems shown in FIG. 1 may be implemented via any type of computing system, such as computing system 600 described in greater detail below with respect to FIG. 6, for example. Each system shown in FIG. 1 may comprise a single device or multiple devices cooperating in a distributed environment. For instance, GRS 130 may be provided via multiple devices arranged in a distributed environment that collectively provide the functionality described herein. Additionally, other components not shown may also be included within the distributed environment.

Figure 2:
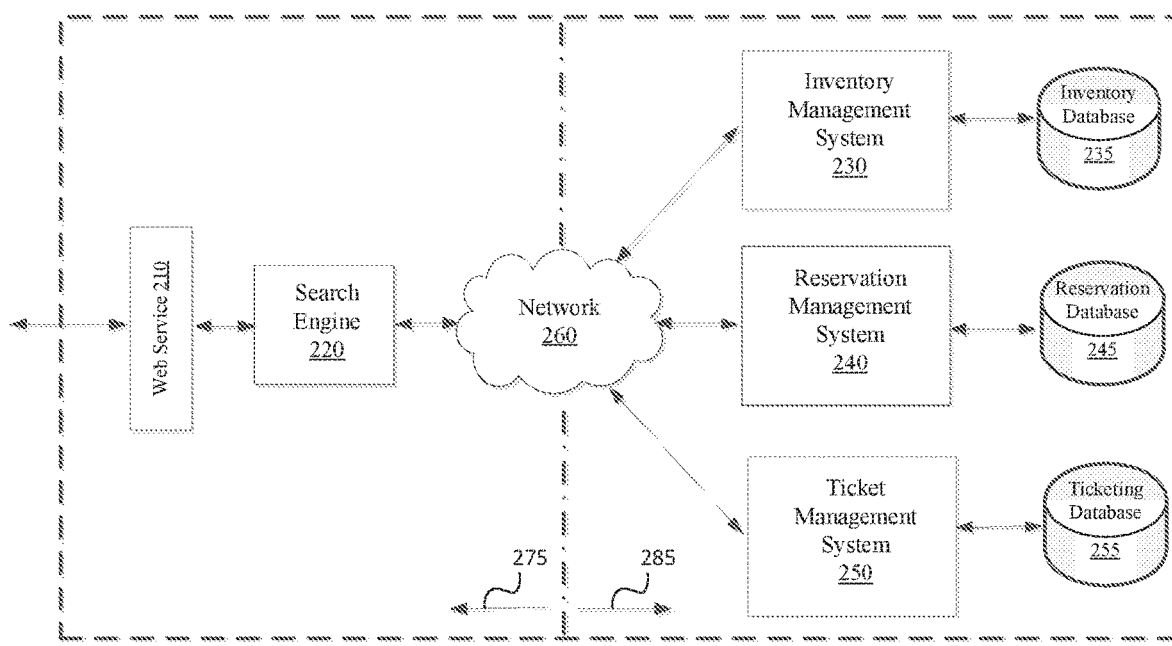
FIG. 2 is a block diagram of an example reservation system that is suitable for implementing aspects of the present invention.

FIG. 2 is a block diagram depicting an example reservation system 200 that is suitable for implementing aspects of the present invention. In an embodiment, reservation system 200 is implemented in PRS 120 of FIG. 1. In an embodiment, reservation system 200 is implemented in GRS 130. As depicted in FIG. 2, reservation system 200 includes front-end systems 275 and back-end systems 285 that exchange data via a network 260 composed of public and private networks, such as the Internet and a reservation system intranet. Front-end systems 275, such as search engine 220, interact directly with clients (e.g., client device 110 of FIG. 1) of reservation system 200 during a travel reservation process. In contrast, clients of reservation system 200 are not exposed to back-end systems 285 that store the travel-related data and effectuate the travel-related services in reservation system 200, such as inventory management system 230, reservation management system 240, and ticket management system 250.

Web service 210 is configured to facilitate networked communications between front-end systems 275 of reservation system 200, such as search engine 220, and applications executing on a remote client device (e.g., client device 110 of FIG. 1). For example, during a search phase of a travel reservation process, search queries submitted by clients of reservation system 200 are directed to search engine 220 via web service 210. Search engine 220 is configured to identify search results having at least one itinerary that satisfies search parameters included in each search query. Examples of such search parameters may include: an origin location, a destination location, a departure date, a return date, a number of passengers associated with a travel request ("a number in party"), a booking class, a number of stops, a flight number, a travel provider identifier, a cabin class (e.g., First Class or Economy), a fare family, a departure hour range, and the like. Search engine 220 is further configured to communicate identified search results to the client devices via web service 210.

Inventory-related data for one or more travel service providers is stored in inventory database 235 under the control of inventory management system 230. In an embodiment, inventory-related data includes availability information that defines unreserved travel services inventory. As used herein, "unreserved travel services inventory" relates to portions of a travel services inventory that are not associated with any reservation records stored in reservation database 245. In contrast, "reserved travel services inventory" relates to portions of a travel services inventory that are associated with one or more reservation records stored in reservation database 245. In an embodiment, inventory-related data includes fare information associated with the unreserved travel services inventory.

Reservation records for one or more travel service providers are stored in reservation database 245 under the control of reservation management system 240. Reservation management system 240 is configured to interact with search engine 220 to process reservation requests received during a booking phase of a travel reservation process. In response to receiving a reservation request identifying a travel itinerary, reservation management system 240 generates a reservation record in reservation database 245. In an embodiment, the reservation record is a passenger name record ("PNR"). The reservation record includes itinerary data and a record locator that uniquely identifies the reservation record in reservation database 245. In an embodiment, the reservation record includes a ticketing time limit. The record locator may also be referred to as a confirmation number, reservation number, confirmation code, booking reference, a PNR number, and the like.

Itinerary data generally includes travel information defining various travel services included in an itinerary and passenger information related to one or more passengers associated with the reservation record. Examples of travel information include: an origin location, a destination location, a departure date, a return date, a number in party, a booking class, a number of stops, a flight number, a travel provider identifier, a cabin class, and the like. Examples of passenger information, for each passenger among the one or more passengers associated with a reservation record, include: name, gender, date of birth, citizenship, home address, work address, passport information, an e-mail address, a phone number, a special service request ("SSR"), and the like.

Ticket records for one or more travel service providers are stored in ticketing database 255 under the control of ticket management system 250. Ticket management system 250 is configured to interact with search engine 220, inventory management system 230, and reservation management system 240 to process ticket issuance requests received during a ticketing phase of a travel reservation process. In processing ticket issuance requests, ticket management system 250 generates ticket records in ticketing database 255 for each travel service segment ("segment") and each passenger associated with the reserved travel itinerary using travel information and passenger information in the reservation record.

For example, a reservation record may include passenger information related to two passengers. The reservation record may further include travel information defining two flight segments for travel from an origin location to a destination location via a stopover location and one flight segment for travel from the destination location to the origin location. In this example, the travel information defines three total flight segments for two passengers. In response to receiving a ticket issuance request associated with the reservation record in this example, ticket management system 250 would generate six ticket records in ticketing database 255. Ticket management system 250 would submit a request to reservation management system 240 to update the reservation record stored in reservation database 245 to include six ticket numbers that identify each ticket record generated. That is, in this example, a single reservation record stored in reservation database 245 would include ticket numbers identifying six ticket records stored in ticketing database 255.

Figure 3:
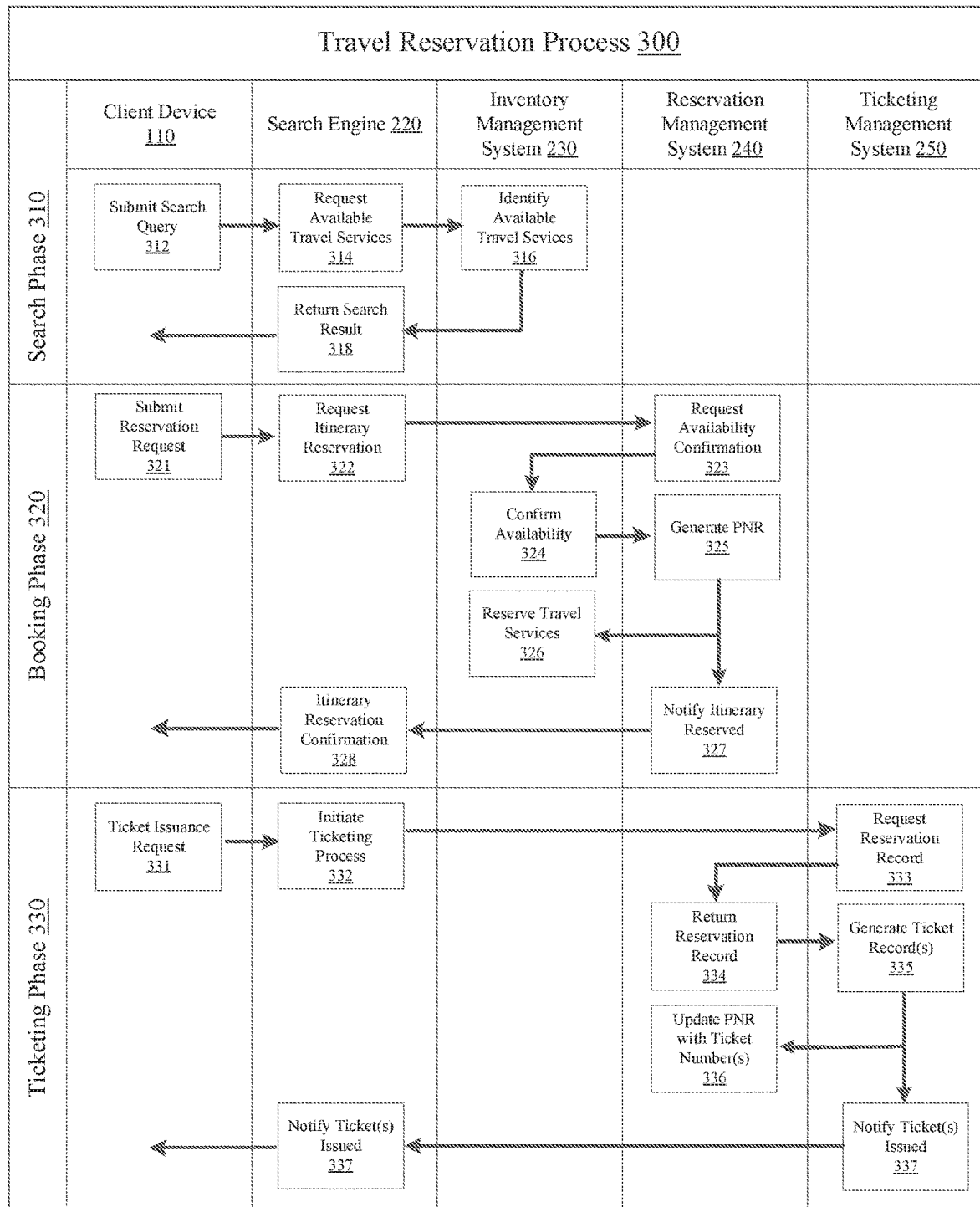
FIG. 3 is a swimlane diagram illustrating a travel reservation process in accordance with an embodiment of the present invention.

FIG. 3 is a swimlane diagram illustrating a travel reservation process 300 in accordance with an embodiment of the present invention. As shown by FIG. 3, travel reservation process 300 may include three phases: a search phase 310, a booking phase 320, and a ticketing phase 330. During search phase 310, at block 312, client device 110 submits a search query to a search engine 220 hosted by a reservation system 200 via web service 210 to search for available travel services. The search query includes multiple search parameters related to one or more travel services identified in the travel request. For example, search parameters related to air travel services may include: an origin location, a destination location, a departure date, a return date, a number of passengers associated with the travel request ("a number in party"), a booking class, a number of stops, a flight number, a travel provider identifier, a cabin class (e.g., First Class or Economy), and the like. As another example, search parameters related to hotel travel services may include: an accommodation location, a check-in date, a check-out date, a number in party, and the like.

At block 314, search engine 220 parses the search query to extract the search parameters and generates a request for available travel services based on the search parameters. Search engine 220 transmits the request for available travel services to inventory management system 230. At block 316, inventory management system 230 may access inventory-related data stored in inventory database 235 to identify a subset of travel services in unreserved travel services inventory that satisfy the request. Inventory management system 230 responds to the request by transmitting data indicative of the identified subset of travel services in unreserved travel services inventory ("available travel services data") to search engine 220. The search engine 220 may also access and retrieve pricing-related data (e.g., fares) for the travel services that is stored in a pricing database. At block 318, search engine 220 generates a search result including one or more recommendations for itineraries that satisfy the search parameters based on the available travel services data received from inventory management system 230 and the pricing-related data. Alternatively, the search engine 220 may be configured to identify a subset of priced travel options in a data cache to generate the search result satisfying the request. Search engine 220 sends the search result to client device 110 in response to the search query.

Travel reservation process 300 transitions from search phase 310 to booking phase 320 when a customer identifies a specific itinerary that satisfies parameters provided during search phase 310. For example, the customer may select one of the itineraries included in the search result sent by search engine 220 to client device 110 at block 318. During booking phase 320, at block 321, client device 110 submits a reservation request to search engine 220 via web service 210 to reserve the selected itinerary including at least one travel service. In an embodiment, the selected itinerary in the reservation request was included in a search result sent by search engine 220 during search phase 310. At block 322, search engine 220 initiates a reservation process executing on reservation management system 240 by forwarding the reservation request to reservation management system 240.

At block 323, the reservation process of reservation management system 240 parses the reservation request to extract the at least one travel service of the itinerary. Reservation management system 240 submits an availability request regarding the at least one travel service to inventory management system 230 and a pricing request regarding the at least one travel service to the pricing database. At block 324, inventory management system 230 accesses inventory-related data stored in inventory database 235 to confirm that the at least one travel service is in the unreserved travel services inventory. Inventory management system 230 generates an availability response having data indicative of whether the at least one travel service is in the unreserved travel services inventory at the time of booking. The availability response is sent by inventory management system 230 to reservation management system 240 in response to the availability request.

At block 325, reservation management system 240 generates a reservation record (e.g., a PNR) to reserve the at least one travel service of the itinerary for the customer. In generating the reservation record, reservation management system 240 submits a request to inventory management system 230 to update inventory database 235 accordingly. To update inventory database 235, any travel services included in the itinerary are associated with the record locator and transitioned from unreserved travel services inventory to reserved travel services inventory, at block 326. In an embodiment, inventory management system 230 interacts with an inventory management system of a travel service provider to propagate the update of inventory database 235 to an inventory database of the travel service provider.

Upon updating inventory database 235, inventory management system 230 may transmit a confirmation message to reservation management system 240. At block 327, reservation management system 240 sends the record locator to search engine 220 to confirm that the itinerary is reserved for the customer. At block 328, search engine 220 sends a reservation confirmation including the record locator to client device 110 in response to the reservation request.

Travel reservation process 300 transitions from booking phase 320 to ticketing phase 330 when payment is received for reserved travel services. During ticketing phase 330, at block 331, client device 110 submits a ticket issuance request to search engine 220 via web service 210. The received ticket issuance request identifies a record locator corresponding to a reserved itinerary generated by reservation management system 240 during booking phase 320. In an embodiment, a ticket issuance request is received after payment is received for a reserved itinerary. In an embodiment, payment for a reserved itinerary is received contemporaneously with the ticket issuance request.

At block 332, search engine 220 initiates a ticketing process executing on ticket management system 250 by forwarding the ticket issuance request to ticket management system 250. Upon receiving the ticket issuance request, ticket management system 250 transmits the record locator to reservation management system 240 at block 333. In response to the record locator, reservation management system 240 forwards a reservation record associated with the record locator to ticket management system 250 at block 334. At block 335, ticket management system 250 generates a ticket record in ticketing database 255 for the at least one travel service of the reserved itinerary using travel information and passenger information in the reservation record. In an embodiment, ticket management system 250 interacts with a ticket management system of a travel service provider to propagate copies of the ticket records generated in ticketing database 255 to a ticketing database of the travel service provider.

At block 336, upon generating the ticket record in ticketing database 255, ticketing management system 250 submits a request to reservation management system 240 to update the reservation record stored in reservation database 245 to include a ticket number that identifies the ticket record generated in block 335. In an embodiment, reservation management system 240 transmits a response message to ticketing management system 250 to confirm the update to reservation database 245 is complete. As discussed above with respect to FIG. 2, a single reservation record stored in reservation database 245 may include multiple ticket numbers that each identify a different ticket record stored in ticketing database 255.

At block 337, ticketing management system 250 sends the ticket number to search engine 220 to confirm that the ticket was issued for the travel service of the reserved itinerary. At block 338, search engine 220 sends a ticketing confirmation including the ticket number to client device 110 in response to the ticket issuance request. For purposes of the present disclosure, travel information provided in a reservation record when a ticketing confirmation is sent to a client device defines a "base state" of any travel services associated with the reservation record.

By way of example, a reservation record may include travel information for a multi-segment itinerary, as discussed above with respect to FIG. 2. In the example of FIG. 2, the reservation record included travel information defining two flight segments for travel from an origin location to a destination location via a stopover location and one flight segment for travel from the destination location to the origin location. When a ticketing confirmation is sent to a client device in this example, the travel information included in the reservation record would both define a base state of the multi-segment itinerary as a whole and a base state of each flight segment composing that itinerary.

Figure 4:
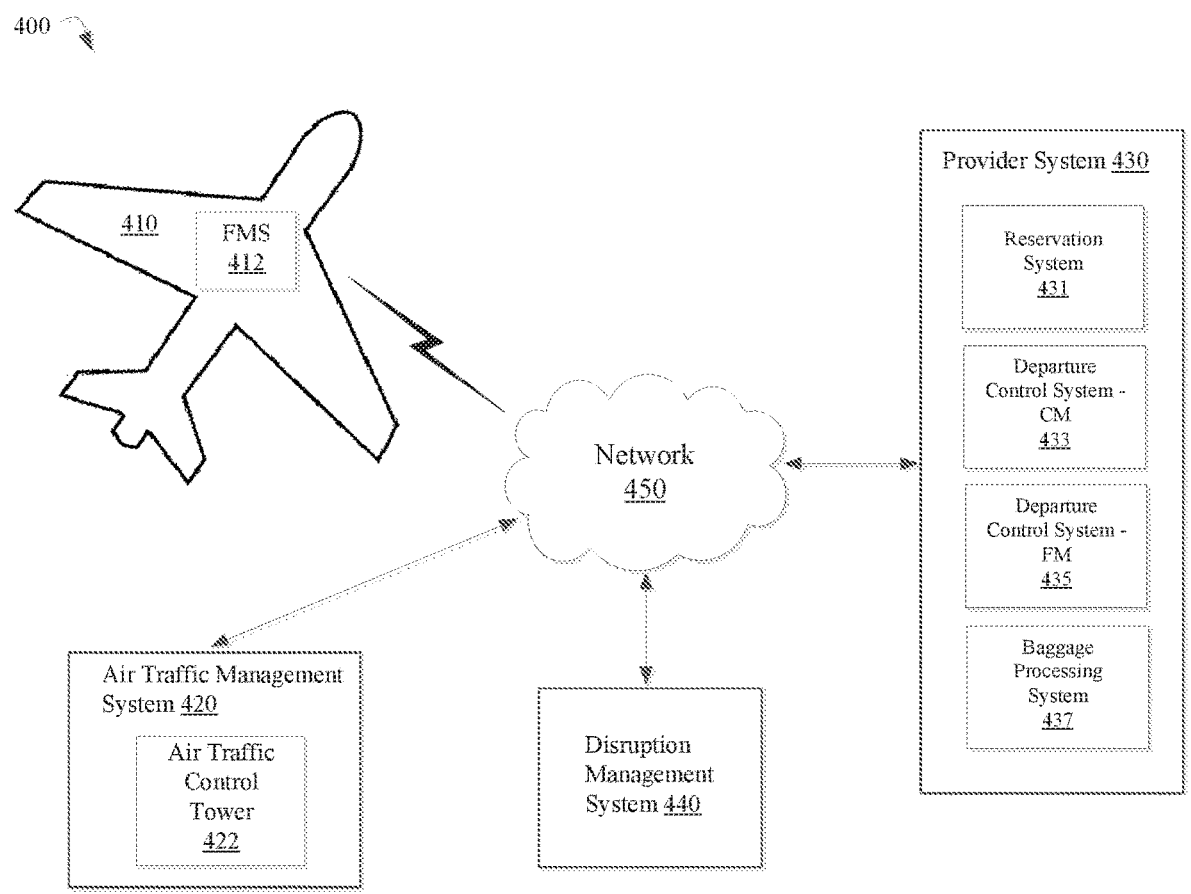
FIG. 4 is a block diagram of an example operating environment that is suitable for implementing aspects of the present invention.

Referring to FIG. 4, an example operating environment for implementing aspects of the present invention is illustrated and designated generally 400. Operating environment 400 generally represents the various systems involved in providing travel services to passengers (or customers) with existing travel reservations in the travel industry. In the example of FIG. 4, the travel services being provided relate to air travel. One skilled in the art will appreciate that travel services unrelated to air travel may be provided to passengers with existing travel reservations in accordance with the present invention. For example, travel services related to travel by bus, rail, car, boat, and the like may also be provided to passengers with existing travel reservations in accordance with the present invention.

Operating environment 400 includes aircraft 410, air traffic management ("ATM") system 420, provider system 430, disruption management system 440 and network 450. Aircraft 410 is a travel conveyance that transports passengers and cargo within an airline route network operated by a travel service provider. In transporting passengers and cargo within the route network, aircraft 410 services one or more flight segments of an itinerary associated with a reservation record. Aircraft 410 includes flight management system ("FMS") 412 that enables aircraft 410 to exchange flight data with one or more external systems via network 450. For purposes of the present disclosure, flight data includes flight plans, navigation data, and the like.

As used herein, "flight plans" refers to formal documents filed by pilots and/or travel service providers with local, regional, or national aviation authorities ("aviation authorities"), such as the Federal Aviation Administration ("FAA") in the United States and EuroControl in the European Union. Flight plans include aircraft identification information (e.g., a flight number), aircraft specification information (e.g., type of aircraft, wake turbulence category, available communication/navigation equipment), flight path information (e.g., departure location, arrival location, en-route waypoints, estimated departure/arrival time, etc.), passenger/crew manifest, available fuel, and the like.

Navigation data refers to various information that is exchanged between aircraft 410 and one or more external systems while aircraft 410 is en-route between a departure location and an arrival location of a segment. Aircraft 410 is "en-route" during a period of time defined by departure time and an arrival time. A departure time is a point in time at which aircraft 410 separates from a jetway (passenger boarding bridge or skybridge) associated with a gate of an airport terminal at a departure location. An arrival time is a point in time at which aircraft 410 couples with a jetway associated with a gate of an airport terminal at an arrival location. Navigation data may include such information as a current position of aircraft 410, a direction of travel (heading information), waypoint-related information, speed, aircraft state data (e.g., weight, remaining fuel, engine speed, altitude, etc.), aircraft environmental information (e.g., air pressure, wind speed/direction, internal/external temperature, turbulence data, etc.), and the like.

In an embodiment, navigation data is exchanged between aircraft 410 and the external systems using flight messages. Flight messages may be exchanged using an Aircraft Communications Addressing and Reporting System ("ACARS"), an Aeronautical Telecommunications Network ("ATN"), a Controller-Pilot Data Link Communications ("CPDLC") system, a Future Air Navigation System ("FANS"), and the like. In an embodiment, flight messages include an Aircraft Initiated Movement Message ("MVA") sent in a format defined by the International Air Transport Association ("IATA") using an ACARS system of aircraft 410. In an embodiment, the one or more external systems forward navigation data to a flight data publication service, such as the System-Wide Information Management ("SWIM") Flight Data Publication Service ("SFDPS") operated by the FAA.

ATM system 420 is configured to monitor and direct aircraft operating on the ground adjacent to an airport facility ("airport") and in controlled airspace to promote the safe and orderly operation of air traffic. In monitoring and directing aircraft, ATM system 420 detects and tracks aircraft using data received from various sources of radar data, verbal position reports received from aircraft operators (e.g., pilots), datalink position reports received from automatic dependent surveillance-broadcast ("ADS-B") components, and the like.

ATM system 420 includes an air traffic control tower ("ATCT") 422 associated with a particular airport facility. ATM system 420 may additionally or alternatively include a Terminal Radar Approach Control ("TRACON") system and/or an Air Route Traffic Control Center ("ARTCC") system. When aircraft 410 is operating within an airspace assigned to a particular airport or on the ground adjacent to the particular airport, an ATCT (e.g., ATCT 422) provides air traffic control services to aircraft 410. When aircraft 410 is operating external to an airspace assigned to a particular airport, a TRACON system and/or an ARTCC system provide air traffic control services to aircraft 410.

For purposes of the present disclosure, air traffic control services include the provisioning of departure/arrival slot times to specific aircraft departing from a particular controlled airspace and/or airport and arriving at the particular controlled airspace and/or airport, respectively. An ATCT generally provisions a departure slot time to specific aircraft departing from a particular airport in response to receiving flight plans for the specific aircraft. For example, ATCT 422 may provision a departure slot time to aircraft 410 in response to receiving flight plans sent by FMS 412 via network 450. Also, ATCT 422 may also assign a specific aircraft to a particular gate of an airport terminal of that airport based in part on aircraft specification information received from departure control system—flight management ("DCS-FM") 435 of provider system 430.

ATM system 420 may also provide various data feeds to aircraft operating on the ground adjacent to an airport and in controlled airspace. Such data feeds generally include: flight information service ("FIS") data, Notice to Airmen messages ("NOTAM"), Terminal Weather Information for Pilots ("TWIP"), Automatic Terminal Information Service ("ATIS") broadcasts, and the like. Such data feeds provide information regarding conflicting traffic conditions, meteorological conditions, active runways at a particular airport, available approaches to a particular airport, other possible hazards to flights, and the like.

Provider system 430 generally represents the various systems that a particular travel service provider employs to provide travel services to passengers with existing travel reservations. As shown in FIG. 4, provider system 430 includes reservation system 431, departure control system—customer management ("DCS-CM") 433, DCS-FM 435, and baggage processing system ("BPS") 437. In an embodiment, reservation system 431 is implemented using reservation system 200 of FIG. 2.

DCS-CM 433 manages passenger-related operations for a particular travel service provider at a specific airport. Such passenger-related operations generally include: interacting with a check-in device thereby enabling passengers with existing reservations to check-in for flights, issuing boarding cards to those passengers via the check-in device, updating reservations records associated with the existing reservations to reflect an appropriate status (e.g., checked-in, boarded, flown, etc.), initiating a baggage acceptance process with BPS 437, facilitating a boarding process with a gate agent workstation or mobile device, generating passenger manifests for a particular flight, and the like. Check-in devices may include: a mobile device of a passenger, a self-service check-in kiosk, a check-in counter workstation, a gate agent workstation, and the like.

DCS-FM 435 manages logistical-related operations for a particular travel service provider at a specific airport. Such logistical-related operations generally include interacting with an inventory management system of reservation system 431 to assign an available aircraft (e.g., aircraft 410) from an inventory of a travel service providers to service a particular segment. The process of assigning an aircraft to service a particular segment is typically referred to as a "tail assignment." Logistical-related operations also include: assigning crew members to operate the assigned aircraft, identifying any special service requests annotated for a specific flight in reservation records stored in a reservation database of reservation system 431, interacting with an inventory management system of reservation system 431 to allocate available resources to satisfy such special service requests, determining appropriate load distributions for the assigned aircraft based in part on data received from BPS 437 and/or DCS-CM 433, interacting with FMS 412 to generate flight plans, transmitting Aircraft Movement Messages ("MVT") to ATM system 420 in a format defined by IATA, and the like. As part of the tail assignment process, the inventory management system of reservation system 431 provides DCS-CM 433 with aircraft specification information thereby enabling DCS-CM 433 to tailor a seat map for the specific flight.

BPS 437 manages baggage-related operations for a particular travel service provider at a specific airport. Such baggage-related operations generally involve accepting, tracking, and loading baggage and/or cargo. For example, BPS 437 may effectuate a baggage acceptance process responsive to a trigger received from DCS-CM 433 upon checking in a passenger. BPS 437 also provides DCS-FM 435 with data regarding the weight and/or exterior dimensions of each item of baggage or cargo accepted to facilitate load distribution determinations. BPS 437 may also generate baggage records for each item of baggage or cargo accepted and update reservations records stored in a reservation database of reservation system 431 with identifiers corresponding to such baggage records.

Disruption management system 440 detects disruption events that impact one or more segments of an itinerary using data obtained from various fragmented sources in operating environment 400. For purposes of the present disclosure, "data obtained from various fragmented sources"

refers to data obtained from two or more elements of operating environment that perform separate and distinct functions or provide different types of information. For example, DCS-CM 433 manages passenger-related operations for a particular travel provider at a specific airport whereas DCS-FM 435 manages logistical-related operations and BPS 437 manages baggage-related operations for the particular travel provider at that specific airport. In this example, data obtained from two or more of DCS-CM 433, DCS-FM 435, and BPS 437 would be considered data obtained from various fragmented sources in operating environment 400.

Similarly, aircraft 410 transports passengers and cargo within an airline route network operated by a travel provider while ATCT 422 provisions a departure slot time to specific aircraft (e.g., aircraft 410) departing from a particular airport. In this case, data obtained from aircraft 410 and ATCT 422 would be considered data obtained from various fragmented sources in operating environment 400.

Also, a TWIP data feed provides weather related information, such as information about any expected weather that will impact airport operations, whereas an ATIS broadcast data feed provides both weather related information and non-weather related information. The non-weather related information provided by the ATIS broadcast data feed may include information related to active runways and available approaches of an airport, as well as an appropriate radio frequency for arriving aircraft to make initial contact with approach control. In this instance, the TWIP and ATIS broadcast data feeds would be considered data obtained from various fragmented sources in operating environment 400.

The following examples illustrate how disruption management system 440 may detect disruption events using data obtained from various fragmented sources in operating environment 400. In the first example, a disruption event impacting a particular segment may include an aircraft swap that replaces an aircraft originally assigned to service the particular segment with a replacement aircraft following a technical failure of the original aircraft. Disruption management system 440 may detect this disruption event by monitoring the data exchanged between DCS-FM 435 and an inventory management system of reservation system 431, as the replacement aircraft is identified; or between DCS-FM 435 and DCS-CM 433, as aircraft specification information for the replacement aircraft is provided. The fragment sources in this example include DCS-FM 435, the inventory system of reservation system 431, DCS-CM 433, or a combination thereof.

In another example, a disruption event impacting a particular segment may include a modification of a seat map corresponding to a travel conveyance servicing that segment. Disruption management system 440 may detect this disruption event by monitoring data exchanged between DCS-FM 435 and an inventory management system of reservation system 431 if the seat map modification arises from an aircraft swap; between DCS-FM 435 and DCS-CM 433, as aircraft specification for a replacement aircraft is provided following the aircraft swap; between DCS-CM 433 and various systems of reservation system 431 (e.g., an inventory management system, a ticketing management system, and/or reservation management system), as part of a seat re-assignment or re-accommodation process; between the various systems of reservation system 431, as various records are updated as part of the seat re-assignment and/or re-accommodation process. The fragment sources in this example include DCS-CM 433, DCS-FM 435, the inventory/reservation/ticketing management systems of reservation system 431, or a combination thereof.

As another example, a disruption event impacting a particular segment may include a delay in a departure time of an aircraft servicing that segment. If the delay is weather related, disruption management system 440 may detect this disruption event using data (e.g., a NOTAM or a TWIP) obtained from a data feed provided by ATM 420, an updated flight plan sent by FMS 412 to ATCT 422, a third-party server hosting an airline schedule service (e.g., Official Airline Guide, the air travel intelligence company of Luton, England), and the like. The fragment sources in this example include ATM 420, FMS 412, ATCT 422, the airline schedule service hosted by the third-party server, or a combination thereof.

In accordance with aspects of the present invention, additional disruption events may include: an unscheduled stopover location being added, a scheduled stopover location being replaced with an unscheduled stopover location, a change in a cabin class associated with the first segment (or other segments of the itinerary), a ground transfer being added, a modification of the first segment (or other segments of the itinerary) that results in a reduced connection time, a special service request associated with the first segment (or other segments of the itinerary) being unfulfilled, a modification of a seat map corresponding to a travel conveyance servicing the first segment (or other segments of the itinerary), a modification of a seating protocol established by a travel provider operating the travel conveyance, an unscheduled gate change, a wait time for retrieval of checked baggage that exceeds a predefined threshold, and the like. Disruption events may also relate to a travel conveyance servicing an impacted segment being cancelled, delayed, rescheduled, diverted en-route, reassigned, replaced, and the like.

In an embodiment, disruption management system 440 obtains data by actively monitoring data exchanges between various systems in operating environment 400. In an embodiment, disruption mitigation system 440 obtains data by intercepting messages or signals exchanged between various systems in operating environment 400. For example, disruption management system 440 may obtain such data by intercepting an MVA message transmitted by an ACARS system of aircraft 410. As another example, disruption management system 440 may obtain such data by intercepting an MVT message exchanged between DCS-FM 435 and ATM system 420. In an embodiment, disruption management system 440 obtains data by subscribing to data feeds provided by one or more systems in operating environment 400.

In response to detecting disruption events, disruption management system 440 determines record identifiers associated with reservation records that were generated in response to ticketing itineraries that include the impacted segment. To determine these record identifiers, disruption management system 440 interacts with a reservation management system of reservation system 431. In each of the reservation records associated with these record identifiers, disruption management system 440 generates a disruption element corresponding to the impacted segment. For purposes of the present disclosure, disruption elements are only generated in reservation records that include itineraries with segments that are impacted by disruption events. As such, reservation records that include itineraries with segments that have not been impacted by disruption events lack disruption elements.

After detecting the disruption event, disruption management system 440 also determines a difference between a base state of the impacted segment and a state of the impacted segment following the disruption event. The disruption element is populated with data indicative of that difference. When a single segment of an itinerary is impacted by a sequence of disruption events, disruption management system 440 iteratively updates the disruption element corresponding to that segment each time an additional disruption event is detected. As a result, that disruption element presents an aggregated view of the net difference between the ticketed travel service and the actual travel service delivered by the travel service provider.

By way of example, disruption management system 440 may detect two disruption events impacting a particular segment. Initially, disruption management system 440 may detect a first delay in a scheduled arrival time of a travel conveyance (e.g., aircraft 410) servicing the impacted segment. After detecting the first disruption event (i.e., the first delay), disruption management system 440 would generate a disruption element corresponding to the impacted segment, as described above. The disruption element would be populated with data indicative of a difference between a base state of the impacted segment and a state of the impacted segment following the first disruption event. In this instance, the difference would be the difference in the scheduled arrival time following the first delay.

Subsequently, disruption management system 440 may detect a second delay in the scheduled arrival time of the travel conveyance servicing the impacted segment. Instead of generating a new disruption element corresponding to that second disruption event (i.e., the second delay), disruption management system 440 would update the existing disruption element. In particular, the existing disruption element would be populated with data indicative of a net difference in the scheduled arrival time relative to the base state of the impacted segment that combines the first delay and the second delay.

If one or more passengers associated with that itinerary is very unfortunate, disruption management system 440 may also detect a modification of a seat map corresponding to the travel conveyance servicing the impacted segment. As a result of the modification of the seat map, those passengers may be assigned to different seats. For example, when ticketed two passengers associated with that itinerary may have been assigned adjacent seats for the impacted segment. Following the modification of the seat map, the passengers may be re-seated such that one passenger is seated in the front of the aircraft while the other passenger is seated at the rear of the aircraft. As another example, when ticketed, one passenger associated with that itinerary may have been assigned to a window seat for the impacted segment. Following the modification of the seat map, the passenger may be re-seated in an aisle seat for the impacted segment. Again, instead of generating a new disruption element corresponding to that third disruption event (i.e., the modification of the seat map), disruption management system 440 would update the existing disruption element. In particular, the existing disruption element would be populated with data indicative of the seat change due to the modification of the seat map along with the data indicative of the net difference in the scheduled arrival time that combines the first delay and the second delay. In other embodiments, the existing disruption element may be populated with data indicative of unfulfilled special service requests, such as an undelivered special dietary meal (e.g., Hallal) or a service to travel with a pet in the cabin of the travel conveyance.

After the first segment terminates, disruption management system 440 may later detect a third disruption event that impacts a second segment of the same itinerary that includes the segment impacted by the first and second disruption events. The third disruption event may be a delay in a scheduled arrival time of a travel conveyance servicing the second segment. In response to detecting the third disruption event, disruption management system 440 would generate a new disruption element corresponding to the second segment in the same reservation record that includes the existing disruption element. Disruption management system 440 would then determine a difference between a base state of the second segment and a state of the second segment following the third disruption event. The new disruption element would then be populated with data indicative of that difference.

By generating the new disruption element instead of updating the existing disruption element, each disruption element provides a segment-specific record of the disruption events impacting the itinerary. That is, each disruption element presents an aggregated view of the net difference between the ticketed travel service and the actual travel service delivered by the travel service provider for a particular segment of the itinerary.

In an embodiment, disruption management system 440 is configured to identify an identifier corresponding to a user profile associated with an itinerary that includes an impacted segment. The identifier corresponding to the user profile may be identified using information obtained from a reservation record generated in response to reserving the itinerary. For example, the user profile may be associated with a frequent flyer program provided by a travel service provider. The user profile may be populated with a disruption metric that quantifies a relative impact of disruption events that impact a particular segment of the itinerary. Disruption management system 440 generates the disruption metric using data obtained from a disruption element in the reservation record that corresponds to the particular segment.

In an embodiment, a time dilution factor is applied to a disruption metric that adjusts the disruption metric based on how much advance notice of a disruption event was provided. A time dilution factor may also adjust a disruption metric based on whether compensation (e.g., monetary compensation, extra frequent flyer miles, a travel voucher for free travel, meal vouchers, a seat in an upgraded cabin class, a seat with extra legroom, a complimentary airline ancillary service, etc.) was provided to a passenger associated with the user profile as restitution for the disruption event.

In an embodiment, disruption management system 440 is configured to identify a root cause of a disruption event using data obtained from the plurality of fragment sources. Examples of a root cause include: a crew delay, a passenger delay, a ground delay, a baggage delay, a tail assignment (e.g., following a malfunction of an aircraft originally assigned), a seasonal schedule change, an ad hoc schedule change, a gate change due to airport operational constraints, and the like. In an embodiment, disruption mitigation system 440 is configured to update a disruption element to include an indication of an identified root cause of a disruption event associated with the disruption element.

Figure 5:
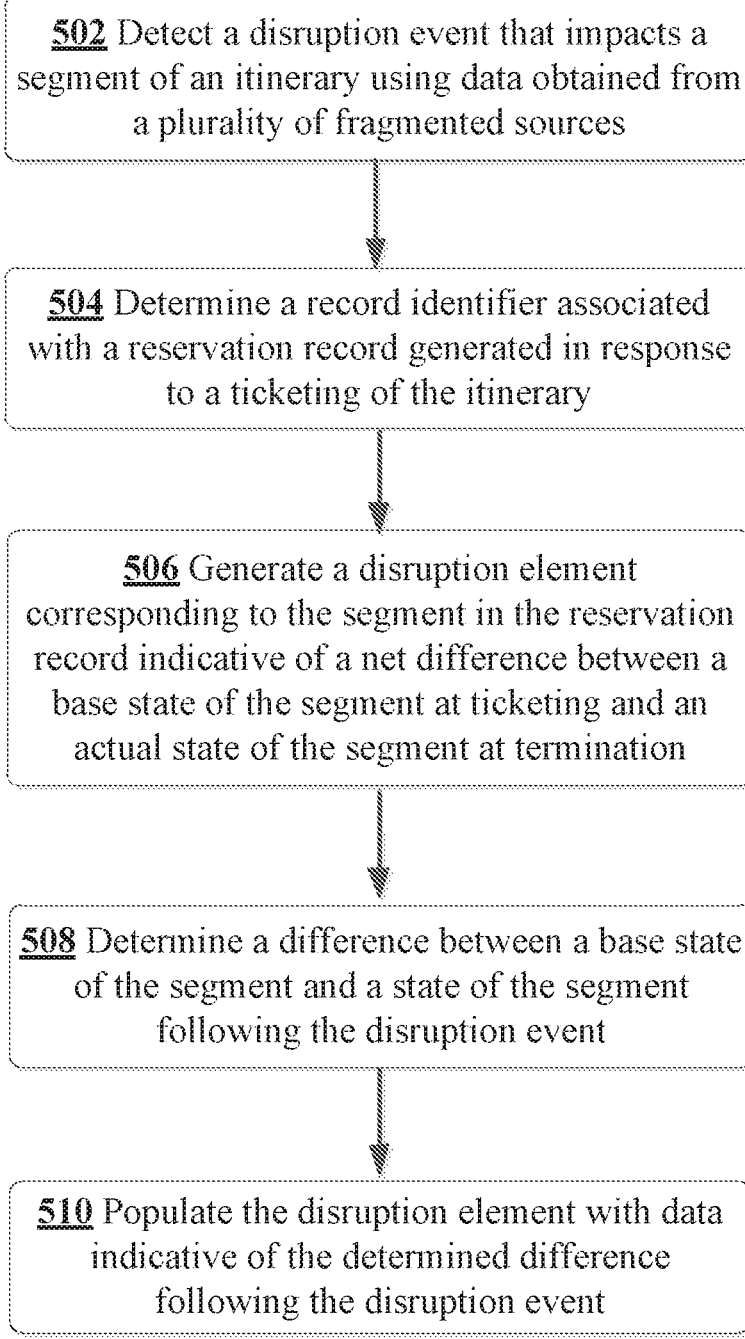
FIG. 5 is a flow-chart illustrating an example of a method for detecting disruption events that impact itineraries using data obtained from a plurality of fragmented sources.

Referring to FIG. 5, an example process 500 for detecting disruption events that impact itineraries using data obtained from a plurality of fragmented sources is illustrated. In an embodiment, process 500 is effectuated by disruption management system 440 of FIG. 4, as it detects disruption events that impact one or more segments of an itinerary included in an existing travel reservation. At block 502, a first disruption event that impacts a first segment of an itinerary is detected using data obtained from a plurality of fragmented sources. In an embodiment, a subset of the data is obtained by subscribing to a data feed provided by an aviation authority. For example, the data feed may be the SFDPS provided by the FAA. In an embodiment, a subset of the data is obtained by intercepting a message or signal exchanged between two of the plurality of fragmented sources. For example, the message may be an updated flight plan transmitted from an FMS (e.g., FMS 412 of FIG. 4) to an ATCT (e.g., ATCT 422), part of an exchange between a DCS-FM and a FMS to generate an updated flight plan, a reply from an inventory management system of a reservation system to a DCS-CM (e.g., an inventory management system of reservation system 431 and DCS-CM 433, respectively) indicating that a requested resource for satisfying a special service request is unavailable, and the like.

At block 504, a record identifier associated with a reservation record generated in a reservation database in response to reserving the itinerary is determined. In an embodiment, the record identifier is determined by querying a reservation management system of a reservation system (e.g., a reservation management system of reservation system 431). In an embodiment, a query to the reservation management system is populated with information derived from a flight plan exchanged between a DCS-CM and an ATM system (e.g., DCS-CM 433 and ATM system 420 of FIG. 4, respectively) or a flight plan exchanged between an aircraft and an ATM system (e.g., aircraft 410 and ATM system 420 of FIG. 4, respectively).

At block 506, in response to detecting the first disruption element, a first disruption element corresponding to the first segment is generated in the reservation record associated with the record identifier. The first disruption element stores data indicative of a net difference between a base state of the first segment at a time of a ticketing of the itinerary and an actual state of the first segment at a time the first segment terminates. In an embodiment, generating the first disruption element includes cascading the first disruption element through a service of a remote server hosting the reservation database. For example, if disruption management system 440 of FIG. 4 generates the first disruption element, disruption management system 440 may need to invoke a service executing on a reservation management system of a reservation system 431 to update the reservation record with the first disruption element. In this example, while disruption mitigation system 440 generates the first disruption element, the service executing on the reservation management system modifies the reservation record in a reservation database to include the first disruption element.

At block 508, a difference between the base state of the first segment and a state of the first segment following the first disruption element is determined using data indicative of the base state obtained from the reservation record. At block 510, the first disruption element is populated with data indicative of the determined difference between the base state of the first segment and the state of the first segment following the first disruption event.

Having described various embodiments of the invention, an exemplary computing environment suitable for implementing embodiments of the invention is now described. With reference to FIG. 6, client device 110, PRS 120, GRS 130, reservation system 200, search engine 220, inventory management system 230, reservation management system 240, ticket management system 250, FMS 412, ATM system 420, ATCT 422, provider system 430, reservation system 431, DCS-CM 433, DCS-FM 435, BPS 437, and disruption management system 440 may be implemented on one or more computer devices or systems, such as exemplary computer system 600. The computer system 600 may include a processor 626, a memory 628, a mass storage memory device 630, an input/output ("I/O") interface 632, and a Human Machine Interface ("HMI") 634. The computer system 600 may also be operatively coupled to one or more external resources 636 via the network 623 or I/O interface 632. External resources may include, but are not limited to, servers, databases, mass storage devices, peripheral devices, cloud-based network services, or any other suitable computer resource that may be used by the computer system 600.

The processor 626 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 628. The memory 628 may include a single memory device or a plurality of memory devices including, but not limited to, read-only memory ("ROM"), random access memory ("RAM"), volatile memory, non-volatile memory, static random access memory ("SRAM"), dynamic random access memory ("DRAM"), flash memory, cache memory, or any other device capable of storing information. The mass storage memory device 630 may include data storage devices such as a hard drive, optical drive, tape drive, non-volatile solid state device, or any other device capable of storing information.

The processor 626 may operate under the control of an operating system 638 that resides in the memory 628. The operating system 638 may manage computer resources so that computer program code embodied as one or more computer software applications, such as an application 640 residing in memory 628, may have instructions executed by the processor 626. In an alternative embodiment, the processor 626 may execute the application 640 directly, in which case the operating system 638 may be omitted. One or more data structures 642 may also reside in memory 628, and may be used by the processor 626, operating system 638, or application 640 to store or manipulate data.

The I/O interface 632 may provide a machine interface that operatively couples the processor 626 to other devices and systems, such as the network 623 or the one or more external resources 636. The application 640 may thereby work cooperatively with the network 623 or the external resources 636 by communicating via the I/O interface 632 to provide the various features, functions, applications, processes, or modules comprising embodiments of the invention. The application 640 may also have program code that is executed by the one or more external resources 636, or otherwise rely on functions or signals provided by other system or network components external to the computer system 600. Indeed, given the nearly endless hardware and software configurations possible, persons having ordinary skill in the art will understand that embodiments of the invention may include applications that are located externally to the computer system 600, distributed among multiple computers or other external resources 636, or provided by computing resources (hardware and software) that are provided as a service over the network 623, such as a cloud computing service.

The HMI 634 may be operatively coupled to the processor 626 of computer system 600 in a known manner to allow a user to interact directly with the computer system 600. The HMI 634 may include video or alphanumeric displays, a touch screen, a speaker, and any other suitable audio and visual indicators capable of providing data to the user. The HMI 634 may also include input devices and controls such as an alphanumeric keyboard, a pointing device, keypads, pushbuttons, control knobs, microphones, etc., capable of accepting commands or input from the user and transmitting the entered input to the processor 626.

A database 644 may reside on the mass storage memory device 630, and may be used to collect and organize data used by the various systems and modules described herein. Inventory database 235, reservation database 245, and ticket database 255 may be implemented using one or more databases, such as database 644. The database 644 may include data and supporting data structures that store and organize the data. In particular, the database 644 may be arranged with any database organization or structure including, but not limited to, a relational database, a hierarchical database, a network database, or combinations thereof. A database management system in the form of a computer software application executing as instructions on the processor 626 may be used to access the information or data stored in records of the database 644 in response to a query, where a query may be dynamically determined and executed by the operating system 638, other applications 640, or one or more modules.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include random access memory ("RAM"), read-only memory ("ROM"), erasable programmable read-only memory ("EPROM"), electrically erasable programmable read-only memory ("EEPROM"), flash memory or other solid state memory technology, portable compact disc read-only memory ("CD-ROM"), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions/acts specified in the flowcharts, sequence diagrams, and/or block diagrams. The computer program instructions may be provided to one or more processors of a general purpose computer, special purpose computer, or other programmable data processing apparatus to produce a machine, such that the instructions, which execute via the one or more processors, cause a series of computations to be performed to implement the functions and/or acts specified in the flowcharts, sequence diagrams, and/or block diagrams.

In certain alternative embodiments, the functions and/or acts specified in the flowcharts, sequence diagrams, and/or block diagrams may be re-ordered, processed serially, and/or processed concurrently without departing from the scope of the embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising."

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed:

1. A system comprising:
  a computing device; and
  a computer-readable storage medium comprising a set of instructions that upon execution by the computing device cause the system to:

obtain data from a plurality of fragmented sources, wherein the data is obtained from two or more elements of the plurality of fragmented sources that perform separate and distinct functions;

detect, based on the data from the plurality of fragmented sources, a first disruption event that impacts a first segment of an itinerary by intercepting data exchanged between a first source and a second source of the plurality of fragmented sources for an identification of a replacement transportation system or a modification of a seat map corresponding to a travel conveyance servicing the first segment;

determine a record identifier associated with a passenger name record ("PNR") generated in a reservation database in response to reserving the itinerary;

in response to detecting the first disruption event based on the data from the plurality of fragmented sources, generate a first disruption element corresponding to the first segment in the PNR associated with the record identifier, the first disruption element storing data indicative of a net difference between a base state of the first segment at a time of a ticketing of the itinerary and an actual state of the first segment at a time that the first segment terminates;

determine a difference between the base state of the first segment and a state of the first segment following the first disruption event using data indicative of the base state obtained from the PNR;

update the first disruption element with data indicative of the determined difference between the base state of the first segment and the state of the first segment following the first disruption event; and present the updated first disruption element as an aggregated view of the determined difference between the base state of the first segment and the state of the first segment following the first disruption event, wherein the updated first disruption element provides a segment-specific record of disruption events impacting the itinerary.

2. The system of claim 1, wherein the set of instructions that upon execution by the computing device further cause the system to:

subsequent to detecting the first disruption event, detect a second disruption event that impacts the first segment of the itinerary; and update the first disruption element with data indicative of a difference between the base state of the first segment and a state of the first segment following the second disruption event.

3. The system of claim 2, wherein the first disruption event is a first delay in a scheduled arrival time of the travel conveyance servicing the first segment, the second disruption event is a second delay in the scheduled arrival time, and the data indicative of the difference between the base state of the first segment and the state of the first segment following the second disruption event is a net difference in the scheduled arrival time that combines the first delay and the second delay.

4. The system of claim 1, wherein the set of instructions that upon execution by the computing device further cause the system to:

detect a third disruption event that impacts a second segment of the itinerary; and in response to detecting the third disruption event, generate a second disruption element corresponding to the second segment in the PNR, the second disruption element storing data indicative of a net difference between a base state of the second segment at a time of a ticketing of the itinerary and an actual state of the second segment at a time the second segment terminates.

5. The system of claim 4, wherein the set of instructions upon execution by the computing device further cause the system to:

determine a difference between the base state of the second segment and a state of the second segment following the third disruption event using data indicative of the base state of the second segment obtained from the PNR; and populate the second disruption element with data indicative of the difference between the base state of the second segment and the state of the second segment following the third disruption event.

6. The system of claim 1, wherein the set of instructions that upon execution by the computing device further cause the system to:

identify an identifier corresponding to a user profile associated with the itinerary using information obtained from the PNR;

generate a disruption metric that quantifies a relative impact of disruption events that impact the first segment using data obtained from the first disruption element; and populate the user profile corresponding to the identifier with the disruption metric.

7. The system of claim 6, wherein the set of instructions upon execution by the computing device further cause the system to:

apply a time dilution factor to the disruption metric that adjusts the disruption metric based on how much advance notice of the first disruption event was provided.

8. The system of claim 1, wherein the plurality of fragmented sources include a customer management departure control system ("DCS-CM") associated with a travel provider servicing the first segment, a flight management departure control system ("DCS-FM") associated with the travel provider, an inventory management system associated with the travel provider, or a combination thereof.

9. The system of claim 2, wherein the second disruption event is a delay in a scheduled arrival time of the travel conveyance, and the data indicative of the difference between the base state of the first segment and the state of the first segment following the second disruption event is a net difference in the scheduled arrival time following the delay and an indication of a seat change due to the modification of the seat map.

10. The system of claim 1, wherein generating the first disruption element includes cascading the first disruption element through a service of a remote server hosting the reservation database.

11. A method comprising:

obtaining data from a plurality of fragmented sources, wherein the data is obtained from two or more elements of the plurality of fragmented sources that perform separate and distinct functions;

detecting, based on the data from the plurality of fragmented sources, a first disruption event that impacts a first segment of an itinerary by intercepting data exchanged between a first source and a second source of the plurality of fragmented sources for an identification of a replacement transportation system or a modification of a seat map corresponding to a travel conveyance servicing the first segment;

determining a record identifier associated with a passenger name record ("PNR") generated in a reservation database in response to reserving the itinerary;

in response to detecting the first disruption event based on the data from the plurality of fragmented sources, generating a first disruption element corresponding to the first segment in the PNR associated with the record identifier, the first disruption element storing data indicative of a net difference between a base state of the first segment at a time of a ticketing of the itinerary and an actual state of the first segment at a time that the first segment terminates;

determining a difference between the base state of the first segment and a state of the first segment following the first disruption event using data indicative of the base state obtained from the PNR;

updating the first disruption element with data indicative of the determined difference between the base state of the first segment and the state of the first segment following the first disruption event; and presenting the updated first disruption element as an aggregated view of the determined difference between the base state of the first segment and the state of the first segment following the first disruption event, wherein the updated first disruption element provides a segment-specific record of disruption events impacting the itinerary.

12. The method of claim 11, further comprising:
iteratively updating the first disruption element in response to detecting additional disruption events that impact the first segment using the data obtained from the plurality of fragmented sources.

13. The method of claim 12, wherein the additional disruption events include: an unscheduled stopover location being added, a scheduled stopover location being replaced with an unscheduled stopover location, a change in a cabin class associated with the first segment, a ground transfer being added, a modification of the first segment that results in a reduced connection time, a special service request associated with the first segment being unfulfilled, a modification of a seating protocol established by a travel provider operating the travel conveyance, an unscheduled gate change, a wait time for retrieval of checked baggage that exceeds a predefined threshold, or a combination thereof.

14. The method of claim 11, further comprising:
identifying a root cause of the first disruption event using the data obtained from the plurality of fragmented sources.

15. The method of claim 14, further comprising:
updating the first disruption element to include an indication of the root cause.

16. The method of claim 14, wherein the root cause relates to a crew delay, a weather condition, a passenger delay, a ground delay, a baggage delay, a tail assignment, a seasonal schedule change, or a combination thereof.

17. The method of claim 11, wherein the first disruption event corresponds to the travel conveyance servicing the first segment being cancelled, delayed, rescheduled, diverted en-route, reassigned, replaced, or a combination thereof.

18. The method of claim 17, wherein the first disruption event is detected using data obtained from an Aircraft Movement Message ("MVT"), an Aircraft Initiated Movement Message ("MVA"), or a combination thereof.

19. A non-transitory computer-readable storage medium comprising computer-readable instructions that upon execution by a processor of a computing device cause the computing device to:

obtain data from a plurality of fragmented sources, wherein the data is obtained from two or more elements of the plurality of fragmented sources that perform separate and distinct functions;

detect, based on the data from the plurality of fragmented sources, a first disruption event that impacts a first segment of an itinerary by intercepting data exchanged between a first source and a second source of the plurality of fragmented sources for an identification of a replacement transportation system or a modification of a seat map corresponding to a travel conveyance servicing the first segment;

determine a record identifier associated with a passenger name record ("PNR") generated in a reservation database in response to reserving the itinerary;

in response to detecting the first disruption event based on the data from the plurality of fragmented sources, generate a first disruption element corresponding to the first segment in the PNR associated with the record identifier, the first disruption element storing data indicative of a net difference between a base state of the first segment at a time of a ticketing of the itinerary and an actual state of the first segment at a time that the first segment terminates;

determine a difference between the base state of the first segment and a state of the first segment following the first disruption event using data indicative of the base state obtained from the PNR;

update the first disruption element with data indicative of the determined difference between the base state of the first segment and the state of the first segment following the first disruption event; and present the updated first disruption element as an aggregated view of the determined difference between the base state of the first segment and the state of the first segment following the first disruption event, wherein the updated first disruption element provides a segment-specific record of disruption events impacting the itinerary.

* * * * *